(12) United States Patent
Harris et al.

(10) Patent No.: US 8,283,563 B2
(45) Date of Patent: Oct. 9, 2012

(54) PROTECTIVE SLEEVE FABRICATED WITH HYBRID YARD, HYBRID YARN, AND METHODS OF CONSTRUCTION THEREOF

(75) Inventors: David Harris, Coatesville, PA (US); Michael Piotrowski, Pltmouth, PA (US); Cassie M. Malloy, Blue Bell, PA (US); Ming-Ming Chen, West Chester, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 411 days.

(21) Appl. No.: 12/554,454

(22) Filed: Sep. 4, 2009

(65) Prior Publication Data
US 2010/0084179 A1    Apr. 8, 2010

Related U.S. Application Data

(60) Continuation-in-part of application No. 12/500,812, filed on Jul. 10, 2009, now abandoned, which is a division of application No. 11/684,984, filed on Mar. 12, 2007, now Pat. No. 7,576,286.

(60) Provisional application No. 60/786,847, filed on Mar. 29, 2006.

(51) Int. Cl.
*H01B 7/08* (2006.01)
(52) U.S. Cl. .................................. 174/117 M
(58) Field of Classification Search ............ 174/36, 174/117 M
See application file for complete search history.

(56) References Cited

U.S. PATENT DOCUMENTS

| | | | |
|---|---|---|---|
| 4,290,260 A | 9/1981 | Wasserman | |
| 4,302,926 A | 12/1981 | Maixner et al. | |
| 4,313,998 A | 2/1982 | Pivot et al. | |
| 4,647,495 A | 3/1987 | Kanayama et al. | |
| 4,755,716 A | 7/1988 | Hayafune et al. | |
| 4,777,789 A | 10/1988 | Kolmes et al. | |
| 4,838,017 A | 6/1989 | Kolmes et al. | |
| 4,886,691 A | 12/1989 | Wincklhofer | |
| 4,912,781 A | 4/1990 | Robins et al. | |
| 5,005,610 A | 4/1991 | Davenport | |
| 5,062,161 A | 11/1991 | Sutton | |
| 5,423,168 A | 6/1995 | Kolmes et al. | |
| 5,427,880 A | 6/1995 | Tamura et al. | |
| 5,632,137 A | 5/1997 | Kolmes et al. | |
| 5,670,284 A | 9/1997 | Kishi et al. | |
| 5,699,680 A | 12/1997 | Guerlet et al. | |
| 5,721,179 A | 2/1998 | Shi et al. | |
| 5,727,357 A * | 3/1998 | Arumugasaamy et al. | ..... 52/834 |
| 5,740,734 A | 4/1998 | Mori et al. | |

(Continued)

FOREIGN PATENT DOCUMENTS
EU     0498216     8/1992
(Continued)

*Primary Examiner* — Chau Nguyen
(74) *Attorney, Agent, or Firm* — Robert L. Stearns; Dickinson Wright, PLLC

(57) ABSTRACT

A hybrid yarn filament and sleeve constructed therefrom for protecting elongate members against at least one of EMI, RFI or ESD is provided, along with methods of constructing the hybrid yarn filament and sleeves. The hybrid yarn filament has a nonconductive filament and at least one conductive wire filament overlying an outer surface of the nonconductive filament. The hybrid yarn filament is arranged in electrical communication with itself or other hybrid yarn filaments during construction of the sleeve to provide uniform shielding against EMI, RFI, and and/or ESD.

11 Claims, 8 Drawing Sheets

U.S. PATENT DOCUMENTS

| | | |
|---|---|---|
| 5,806,295 A | 9/1998 | Robins et al. |
| 5,855,169 A | 1/1999 | Mori et al. |
| 5,881,547 A | 3/1999 | Chiou et al. |
| 5,927,060 A | 7/1999 | Watson |
| 6,016,648 A | 1/2000 | Bettcher et al. |
| 6,033,779 A | 3/2000 | Andrews |
| 6,132,871 A | 10/2000 | Andrews |
| 6,216,431 B1 | 4/2001 | Andrews |
| 6,328,080 B1 | 12/2001 | Winters |
| 6,363,703 B1 | 4/2002 | Kolmes |
| 6,639,148 B2 | 10/2003 | Marks |
| 6,777,056 B1 | 8/2004 | Boggs et al. |
| 6,779,330 B1 | 8/2004 | Andrews et al. |
| 6,800,367 B2 | 10/2004 | Hanyon et al. |
| 6,803,332 B2 | 10/2004 | Andrews |
| 6,843,078 B2 | 1/2005 | Rock et al. |
| 7,102,077 B2 | 9/2006 | Aisenbrey |
| 2002/0195260 A1 | 12/2002 | Marks |
| 2004/0065072 A1 | 4/2004 | Zhu et al. |
| 2004/0237494 A1 | 12/2004 | Karaylanni et al. |
| 2005/0028512 A1 | 2/2005 | Boni |
| 2005/0124249 A1 | 6/2005 | Uribarri |
| 2005/0282009 A1 | 12/2005 | Nusko |
| 2007/0275199 A1 | 11/2007 | Chen |

FOREIGN PATENT DOCUMENTS

| | | |
|---|---|---|
| FR | 2643914 | 9/1990 |
| FR | 2652826 | 4/1991 |
| JP | 3-120624 | 12/1991 |
| JP | 10163674 | 6/1998 |
| JP | 11293532 | 10/1999 |
| JP | 2004-190194 A | 7/2004 |

* cited by examiner

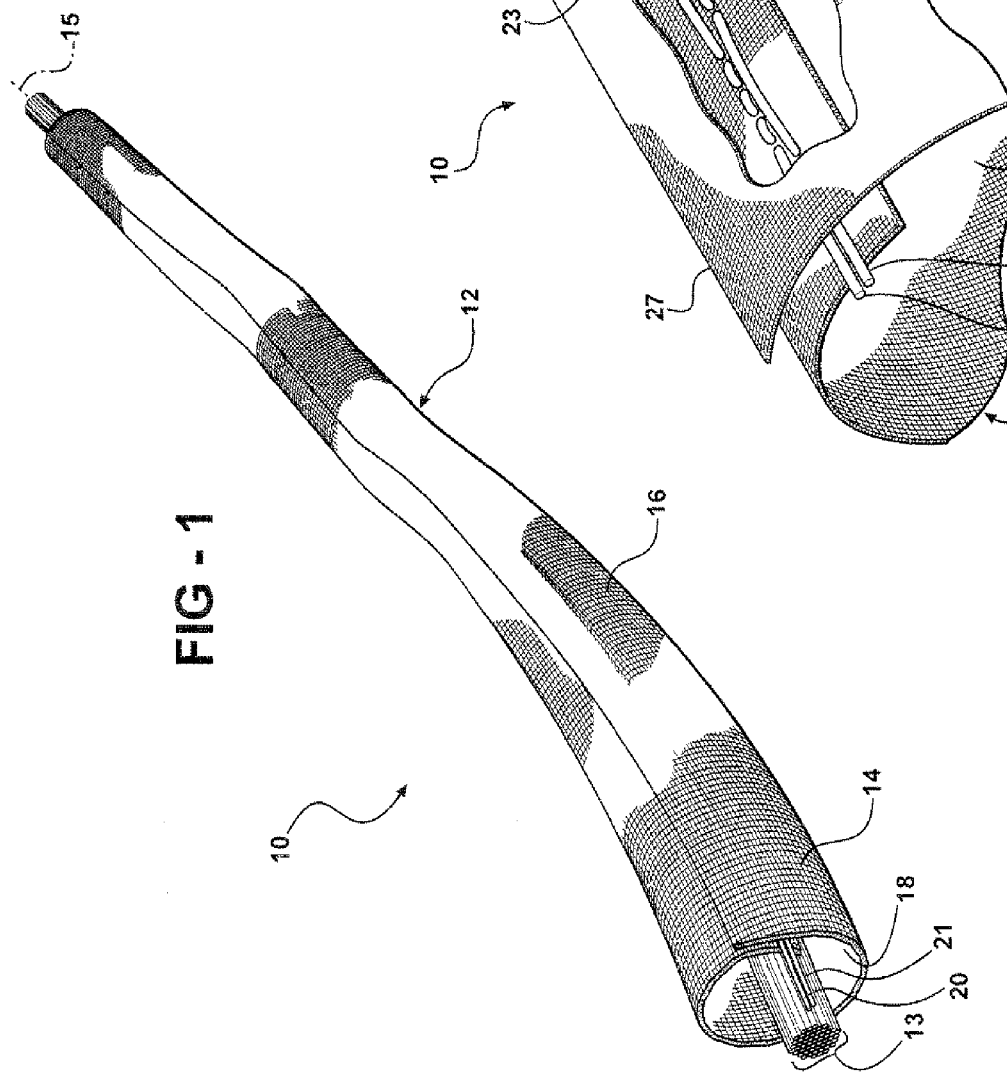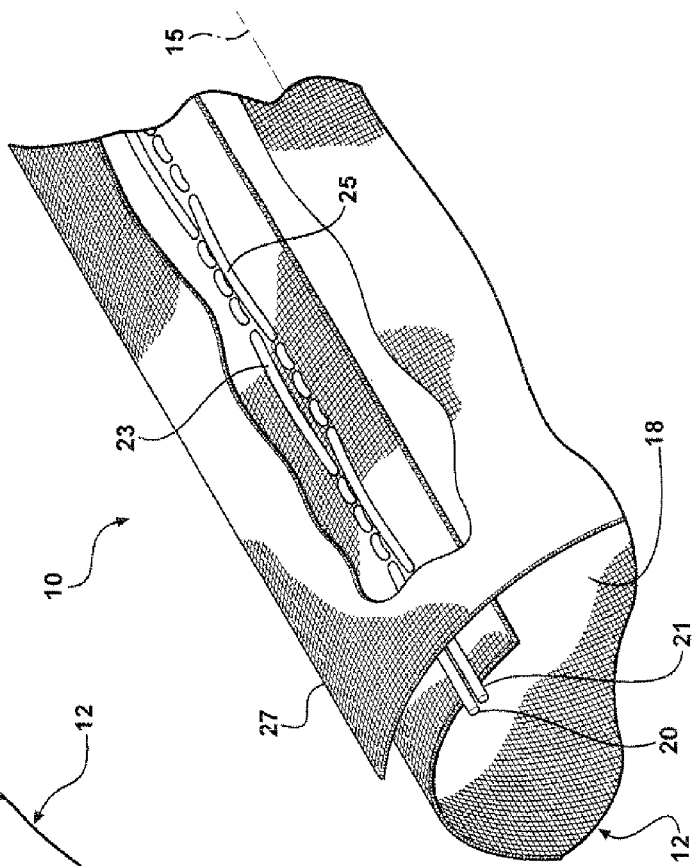

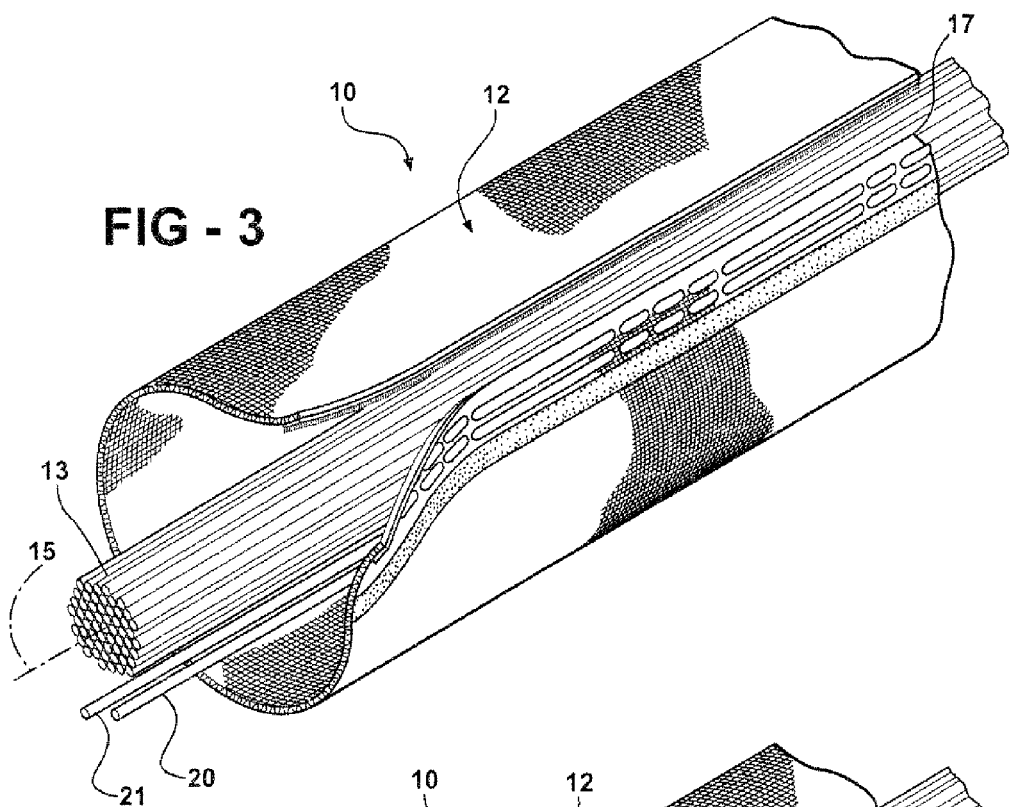
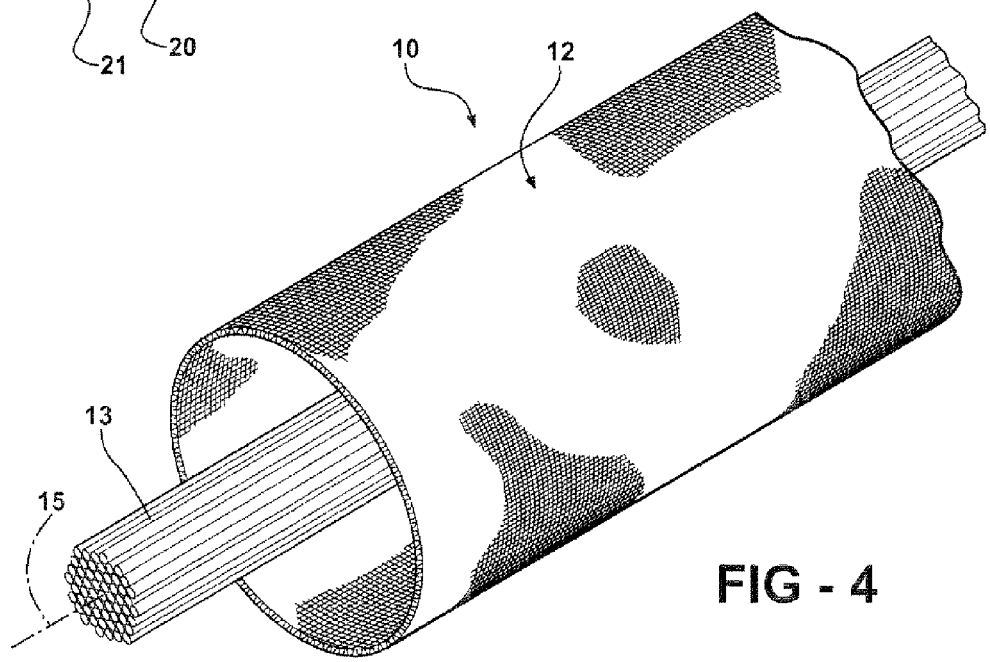

PROTECTIVE SLEEVE FABRICATED WITH HYBRID YARD, HYBRID YARN, AND METHODS OF CONSTRUCTION THEREOF

CROSS-REFERENCE TO RELATED APPLICATIONS

This application is a continuation-in-part application of U.S. application Ser. No. 12/500,812, filed Jul. 10, 2009, now abandoned which is a divisional application of U.S. application Ser. No. 11/684,984, filed Mar. 12, 2007, now issued as U.S. Pat. No. 7,576,286, which claims priority to U.S. Provisional Application Ser. No. 60/786,847, filed Mar. 29, 2006, all of which are incorporated herein by reference their entirety.

BACKGROUND OF THE INVENTION

1. Technical Field

This invention relates generally to sleeves for protecting elongate members and more particularly to EMI/RFI/ESD shielding yarns and sleeves constructed therefrom.

2. Related Art

It is known that electromagnetic interference (EMI), radio frequency interference (RFI), and electrostatic discharge (ESD) can pose a potential problem to the proper functioning of electronic components caused by interference due to inductive coupling between nearby electrical conductors and propagating electromagnetic waves. Electronic systems generate electromagnetic energy due to the flow of current within a circuit. This electromagnetic energy can adversely affect the performance of surrounding electronic components, whether they are in direct communication within the circuit, or located nearby. For example, electrical currents in conductors associated with an electrical power system in an automobile may induce spurious signals in various electronic components, such as an electronic module. Such interference could downgrade the performance of the electronic module or other components in the vehicle, thereby causing the vehicle to act other than as desired. Similarly, inductive coupling between electrical wiring in relatively close relation to lines carrying data in a computer network or other communication system may have a corrupting effect on the data being transmitted over the network.

The adverse effects of EMI, RFI and ESD can be effectively eliminated by proper shielding and grounding of EMI, RFI and ESD sensitive components. For example, wires carrying control signals which may be subjected to unwanted interference from internally or externally generated EMI, RFI and ESD may be shielded by using a protective sleeve. Protective sleeves can be generally flat or cylindrical, wherein the sleeves are formed from electrically conductive and nonconductive constituents, with the conductive constituents typically being grounded via a drain wire interlaced with the yarns during manufacture of the sleeve. Known conductive constituents take the form of nonconductive fibers or filaments, such as nylon, coated with a conductive metal, such as silver. Other known conductive constituents are fabricated by impregnating a nonconductive resin with micro fibers of metal, such as stainless steel, copper or silver, or with micron size conductive powders of carbon, graphite, nickel, copper or silver, such that the micro fibers and/or powders are bonded in conductive communication.

While such RFI, EMI, and ESD sleeving made with coated conductive yarns is generally effective at eliminating electrical interference, the sleeving can be relatively expensive in manufacture, particularly when expensive coatings, such as silver, are used. In addition, conductive coatings can be worn off, leading to inefficiencies in conductive connections between the conductive constituents, thereby impacting the ability of the sleeving to provide optimal RFI, EMI, and/or ESD protection. Accordingly, RFI, EMI, ESD shielding which is more economical in manufacture, and more efficient in use, and more reliable against wear and having an increased useful life, is desired.

A sleeve manufactured from fabric according to the present invention overcomes or greatly minimizes at least those limitations of the prior art described above, thereby allowing components having potential adversarial effects on one another to function properly, even when near one another.

SUMMARY OF THE INVENTION

One aspect of the invention provides a conductive hybrid yarn filament for constructing a fabric sleeve for protecting elongate members against at least one of EMI, RFI or ESD. The hybrid yarn filament has an elongate nonconductive monofilament and an elongate continuous conductive wire filament overlying an outer surface of said nonconductive monofilament. Accordingly, the wire filament or filaments are able to establish electrical contact with one another. As such, with the wire filaments being continuous wire filaments arranged in electrical communication with one another, the sleeve is provided with optimal conductivity. Thus, effective and uniform EMI, RFI and/or ESD protection is provided to the elongate members housed within the sleeve.

Yet another aspect of the invention includes a method of constructing a conductive hybrid yarn used for forming a sleeve, wherein the sleeve provides protection to elongate members against at least one of EMI, RFI and/or ESD. The method includes providing a nonconductive elongate monofilament and an elongate conductive wire filament. Then, overlying an outer surface of the nonconductive monofilament with the conductive wire filament.

Yet another aspect of the invention provides a fabric sleeve for protecting elongate members against at least one of EMI, RFI or ESD. The fabric sleeve has at least one hybrid yarn filament having an elongate nonconductive monofilament and an elongate continuous conductive wire filament overlying an outer surface of the nonconductive monofilament. The wire filament is interlaced in electrical communication with itself or with other ones of the wire filaments along a portion of the sleeve to provide protection to the elongate members against at least one of EMI, RFI or ESD.

Yet another aspect of the invention includes a method of constructing a fabric sleeve for protecting elongate members against at least one of EMI, RFI or ESD. The method includes providing at least one hybrid yarn filament having a nonconductive monofilament and at least one continuous conductive wire filament overlying an outer surface of the nonconductive filament. Further, interlacing the at least one hybrid yarn filament in electrical communication with itself or other ones of the hybrid yarn-filaments to form a fabric. Then, forming the fabric into the sleeve.

Accordingly, sleeves produced at least in part with hybrid yarn in accordance with the invention are useful for shielding elongate members from EMI, RFI and/or ESD, wherein the sleeves can be constructed having any desired shape, whether flat, cylindrical, box shaped, or otherwise. In addition, the sleeves can be made to accommodate virtually any package size by adjusting the fabricated width, height, and length in manufacture, and can be equipped with a variety of closure mechanisms. Further, the sleeves are at least somewhat flexible in 3-D without affecting their protective strength, conductivity, and thus shielding ability, thereby allowing the sleeves to bend, as needed, to best route the elongate members without affecting the EMI, RFI and/or ESD protection provided by the sleeves.

BRIEF DESCRIPTION OF THE DRAWINGS

These and other features and advantages will become readily apparent to those skilled in the art in view of the following detailed description of the presently preferred embodiments and best mode, appended claims, and accompanying drawings, in which:

FIG. 1 is a perspective view of a self-wrapping sleeve constructed with yarn according to one presently preferred embodiment of the invention;

FIG. 2 is a schematic fragmentary partially broken away perspective view of the sleeve of FIG. 1;

FIG. 3 is a schematic fragmentary perspective view of a sleeve constructed according to another presently preferred embodiment;

FIG. 4 is a schematic fragmentary perspective view of a sleeve constructed according to yet another presently preferred embodiment of the invention;

DETAILED DESCRIPTION OF PREFERRED EMBODIMENTS

Figure 5:
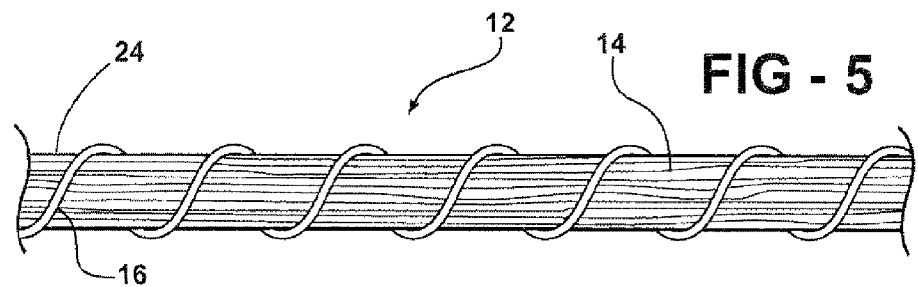
FIG. 5 is an enlarged schematic view of a yarn constructed according to one presently preferred embodiment.

Referring in more detail to the drawings, FIG. 1 shows a sleeve 10 constructed from yarn, including at least in part hybrid yarns or filaments, referred to hereafter as hybrid yarn members 12, constructed according to the invention. The term filaments herein is meant to include monofilaments and/or multifilaments, with specific reference being given to the type of filament, as necessary. The hybrid yarn members 12 (FIGS. 5-16) are formed with nonconductive monofilament and/or nonconductive multifilament members, referred to hereafter simply as nonconductive members 14, unless otherwise specified, twisted and/or served with strands of micron-sized continuous conductive wire filaments, referred to hereafter simply as wire filaments 16. The individual wire filaments 16 are about 20-100 μm in diameter, for example, and provide the sleeve 10 with at least one of electromagnetic interference (EMI), radio frequency interference (RFD, and/or electrostatic discharge (ESD) protection for an elongate member or members 13 bundled within the sleeve 10. Once enclosed, the bundle of generally enclosed wires 13 receives optimal protection from any unwanted interference, such as inductive coupling interference or self-induced internal reflective interference, thereby providing any electrical components connected to the bundle of wires 13 with the desired operating efficiency. Accordingly, the sleeve 10 prevents the bundled wires 13 from having a self-induced adverse affect on electrical components to which they are connected, while also preventing interference of the bundled wires 13 with any nearby electrical components not in direct electrical communication therewith.

As shown in FIGS. 1 and 2, the sleeve 10 is represented, by way of example and without limitations, as being self-wrapping about a longitudinal axis 15, wherein the self-wrapping bias can be imparted via heat-setting, via weft-wise filaments being placed under tension, or via warp-wise filaments exerting a bias about the axis 15, for example, to define an elongate, enclosed channel 18 for receiving the bundled wires 13. At least one or more hybrid yarn members 12 (FIGS. 5-16) are preferably interlaced with one another in the fill direction and can be constructed at least in part of a thermoplastic, such as, by way of example and without limitation, polyester, thereby allowing the sleeve 10 to be heat-set or otherwise biased into a tubular form. It should be recognized that sleeves 10 constructed with the yarn members 12 can be constructed in any desired protective sleeve form, such as generally flat (FIG. 3, shown before being generally flattened), whether self-closing or assisted, such as via hook and loop fasteners 17, for example, or as a seamless cylindrical form (FIG. 4), for example, via a weaving, knitting, braiding or crocheting process. Accordingly, the invention is not limited to the profile of the sleeve, and thus, contemplates the manufacture and construction of any sleeve profile that provides a secure, durable, flexible covering for organizing and protecting elongate members 13, such as a wire harness, from EMI, RFI and/or ESD.

To facilitate elimination of any unwanted interference, the sleeve 10 is preferably constructed with at least one, and preferably a pair of drain wires 20, 21 (FIG. 2) interlaced at least partially with one or more hybrid yarn members 12, wherein the drain wires 20, 21 are arranged for suitable connection to a ground (not shown). The drain wires 20, 21 are preferably arranged in electrical communication with one another and in electrical communication with the conductive wire filaments 16. The drain wires 20, 21 can be provided having any suitable diameter, and are generally provided between about 18-24 gauge, and of any suitable metal, such as single strand or twisted multiple strands of tin or nickel plated copper, or stainless steel, for example. The drain wires 20, 21 are oriented to extend lengthwise along the longitudinal axis 15 of the sleeve 10, with at least one of the drain wires 20 preferably being extendable away from the sleeve 10 for operable electrical communication with the ground. The drain wire 20 is shown interlaced at a plurality of axially spaced locations to provide float sections 23, with float section 23 having the ability to be laterally extended from the sleeve 10, as desired. The other drain wire 21 is represented here, for example, as also being interlaced at a plurality of axially spaced locations to provide float sections 25 along the length of the sleeve 10. As represented in FIG. 2, the drain wires 20, 21 can be positioned along a portion of the sleeve 10 so that they can be overlapped and protectively covered by a selvage, referred to hereafter as a free edge 27 of the sleeve 10. It should be recognized that the drain wire 20 or wires 20, 21 are arranged in electrical communication with the conductive wire filaments 16 by virtue of the conductive wire filaments 16 being twisted or served such that they extend outwardly from the nonconductive members 14.

The nonconductive members 14, in one presently preferred embodiment, are provided as multi-filamentary yarns, also referred to as multifilaments, which provides the sleeve 10 with a soft texture, enhanced drape, and enhanced noise dampening characteristics. Depending on the application, the nonconductive members 14, whether multifilaments or monofilaments, as discussed in more detail hereafter, can be formed from, by way of example and without limitation, polyester, nylon, polypropylene, polyethylene, acrylic, cotton, rayon, and fire retardant (FR) versions of all the aforementioned materials when extremely high temperature ratings are not required. If higher temperature ratings are desired along with FR capabilities, then the nonconductive members 14 could be constructed from, by way of example and without limitation, materials including m-Aramid (sold under names Nomex, Conex, Kennel, for example), p-Aramid (sold under names Kevlar, Twaron, Technora, for example), PEI (sold under name Ultem, for example), PPS, LCT, TPFE, and PEEK. When even higher temperature ratings are desired along with FR capabilities, the nonconductive members 14 can include mineral yarns such as fiberglass, basalt, silica and ceramic, for example.

Figure 6:
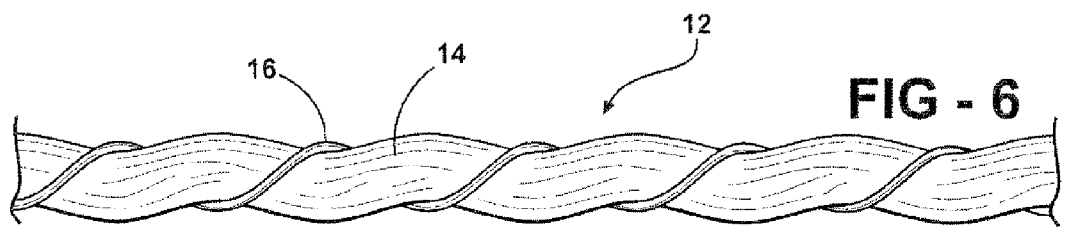
FIG. 6 is an enlarged schematic view of a yarn constructed according to another presently preferred embodiment.

As mentioned, the continuous conductive wire filaments 16 can be either served with the nonconductive member 14, such as shown in FIG. 5, for example, such that the nonconductive member 14 extends along a generally straight path, while the conductive wire filament 16 extends along a helical path about the nonconductive member 14, or twisted with the nonconductive members 14, such as shown in FIG. 6, for example, such that they form axially offset helical paths relative to one another. Regardless of how constructed, it is preferred that at least a portion of the conductive wire filaments 16 remain or extend radially outward of an outer surface 24 of the nonconductive members 14. This facilitates maintaining effective EMI, RFI and/or ESD shielding properties of the sleeve 10 constructed at least in part from the hybrid yarn members 12. The conductive wire filaments 16 are preferably provided as continuous strands of stainless steel, such as a low carbon stainless steel, for example, SS316L, which has high corrosion resistance properties, however, other conductive continuous strands of metal wire could be used, such as, copper, tin or nickel plated copper, aluminum, and other conductive alloys, for example.

Figure 7:
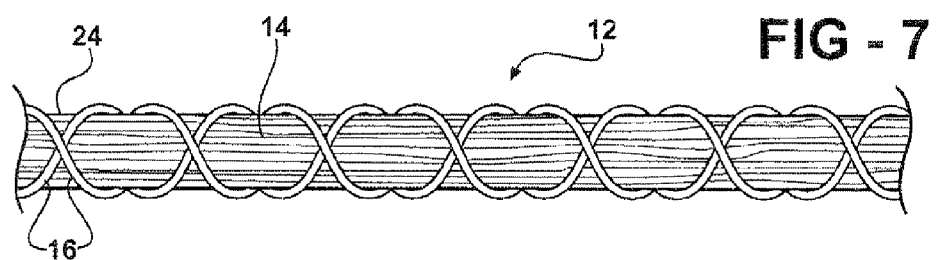
FIG. 7 is an enlarged schematic view of a yarn constructed according to another presently preferred embodiment.
Figure 8:
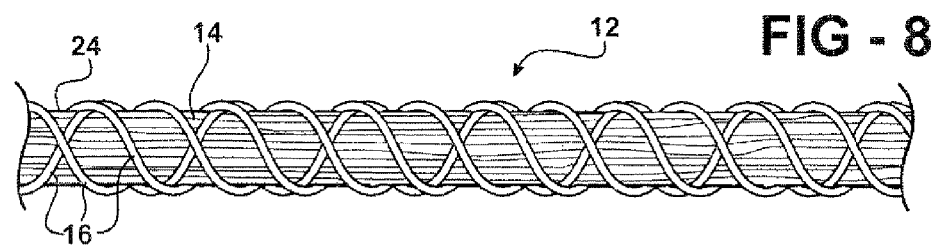
FIG. 8 is an enlarged schematic view of a yarn constructed according to yet another presently preferred embodiment.

The continuous conductive wire filaments 16 can overlie the nonconductive member or members 14 by being twisted or served about the nonconductive members 14 to form the hybrid yarn members 12 having a single strand conductive wire filament 16 (FIGS. 5 and 6, 9), two strands of conductive wire filaments 16 (FIGS. 7, 10-14), three strands of conductive wire filaments 16 (FIG. 8), or more (FIGS. 15 and 16), as desired, extending substantially along the length of the hybrid yarn members 12. It should be recognized that any desired number of conductive wire filaments 16 can be used, depending on the conductivity and shielding sought, with the idea that an increased number of conductive wires along the length of the hybrid yarn members 12 generally increases the conductive properties of the hybrid yarn members 12. When two or more conductive wire filaments 16 are used, they can be arranged to overlap one another, such as, by way of example and without limitation, by having different helical angles and/or by twisting or serving the wire filaments 16 in opposite helical directions, as shown in FIGS. 7 and 8, or they can be configured in non-overlapping relation with one another by having similar helical angles and by being twisted or served in the same helical direction, such as shown in FIGS. 11-14, for example. Regardless of how many conductive wire filaments 16 are used, it is preferable that they remain at least partially exposed outwardly from the outer surface 24 of the nonconductive members 14 to maximize the EMI, RFI and/or ESD shielding properties of the hybrid yarn members 12.

The arrangement of the wire filaments 16, and their specific construction, whether having single, double, triple, or more conductive wires 16, used in constructing the hybrid yarn members 12, is selected to best maximize the shielding potential desired. In accordance with one presently preferred aspect of a fabric woven in accordance with the invention, by way of example and without limitation, the hybrid yarn members 12 traversing the warp direction of the sleeve 10 have two or more conductive wire filaments 16 and the hybrid yarn members 12 traversing the weft or fill direction of the sleeve 10 have a single conductive wire 16. This construction provides the resulting sleeve 10 with optimal EMI, RFI, and ESD shielding capabilities, while also providing the sleeve 10 with maximum drape about the longitudinal axis 15, which can facilitate forming the sleeve 10 into the desired shape, whether flat or generally cylindrical. It should be recognized that the conductive wire filament or filaments 16 are preferably maintained in electrical communication with themselves or other ones of the filaments 16. As such, for example, wire filaments 16 traversing the warp direction are maintained in electrical contact with the conductive wire filaments 16 traversing the fill direction, thereby establishing a complete grid or network of EMI, RFI and/or ESD shielding about the outer surface of the sleeve 10. This is particularly made possible by the conductive wire filaments 16 extending radially outward from the nonconductive filaments 14, as discussed.

An additional consideration given in the construction of the hybrid yarn members 12 is to best provide the hybrid yarns 12 in both the fill and warp directions with a generally similar denier (used in context with multifilaments) and/or diameter (used in context with monofilaments). As such, when each of the fill hybrid yarn members 12 have a single conductive wire filament 16, the associated underlying nonconductive filament 14 has a larger denier and/or diameter in comparison to the nonconductive filaments 14 used in the warp hybrid yarn members 12, which, as mentioned, can have two or more conductive wire filaments 16. By providing the fill and warp hybrid yarns 12 with approximately or substantially the same denier and/or diameter, the resulting sleeve fabric has a smoother appearance and feel, thereby enhancing the abrasion resistance of the resulting sleeve 10.

For example, a fill hybrid yarn member 12 having a single continuous strand of stainless steel wire filament 16, between about 20-100 μM in diameter, and in one example, about 50 μm in diameter (this diameter of wire in our examples equates to about 140 denier), twisted or served about nonconductive PET multifilament 14 of about 1100 denier, results in the hybrid yarn member 12 being about 1240 denier. Further, a warp hybrid yarn member 12 having two continuous strands of stainless steel wire filament 16, between about 20-100 μm in diameter, and in this example, about 50 μm in diameter, twisted or served about nonconductive PET monofilament or multifilament 14 of about 970 denier, results in the hybrid warp yarn member 12 being about 1250 denier. Thus, the resulting deniers of the warp and fill hybrid yarns 12 are substantially or approximately equal to one another.

In another example, a hybrid fill yarn member 12 having a single continuous strand of stainless steel wire filament 16, between about 20-100 μm in diameter, and in this example, about 50 μm in diameter, twisted or served about nonconductive PET monofilament or multifilament 14 of about 1100 denier, results in the hybrid yarn member 12 being about 1240 denier. Further, a hybrid warp yarn member 12 having three continuous strands of stainless steel wire filament 16, between about 20-100 μm in diameter, and in this example, about 50 μm in diameter, twisted or served about PET nonconductive monofilament or multifilament 14 of about 830 denier, results in the hybrid warp yarn member 12 being about 1250 denier. So, again, the resulting fill and warp direction hybrid yarns 12 are substantially or approximately the same denier.

In yet another example, a hybrid fill yarn member 12 having a single continuous strand of stainless steel wire filament 16, between about 20-100 μm in diameter, and in this example, about 35 μm in diameter (this diameter of wire in our examples equates to about 70 denier), twisted or served about nonconductive m-Aramid multifilament 14 of about 530 denier, results in the hybrid yarn member 12 being about 600 denier. Further, a hybrid warp yarn member 12 having two continuous ends, between about 20-100 μm in diameter, and in this example, about 35 μm in diameter, of stainless steel wire filament 16 twisted or served about m-Aramid nonconductive multifilament 14 of about 460 denier, results in the hybrid warp yarn member 12 being about 600 denier. Therefore, the resulting fill and warp hybrid yarns 12 are again substantially or approximately the same denier.

In yet a further example, a hybrid fill yarn member 12 having a single continuous strand of stainless steel wire filament 16, between about 20-100 μm in diameter, and in this example, about 35 μm in diameter, twisted or served about nonconductive m-Aramid multifilament 14 of about 530 denier, results in the hybrid yarn member 12 being about 600 denier. Further, a hybrid warp yarn member 12 having three continuous strands of stainless steel wire filament 16, between about 20-100 μm in diameter, and in this example, about 35 μm in diameter, twisted or served about m-Aramid nonconductive multifilament 14 of about 390 denier, results in the hybrid warp yarn member 12 being about 600 denier. Again, the resulting deniers of the hybrid fill and warp yarns 12 are substantially or approximately the same.

Accordingly, as the examples above demonstrate, without limitation, numerous constructions and arrangements of fill and warp hybrid yarns 12 are possible. Further, as mentioned, more warp conductive wire filaments 16 could be used to effectively increase the conductivity of the conductive hybrid yarn members 12, thereby enhancing the EMI, RFI and/or ESD shielding effectiveness, with the resulting deniers of the warp and fill hybrid yarn members 12 preferably remaining approximately equal to one another.

Figure 9:
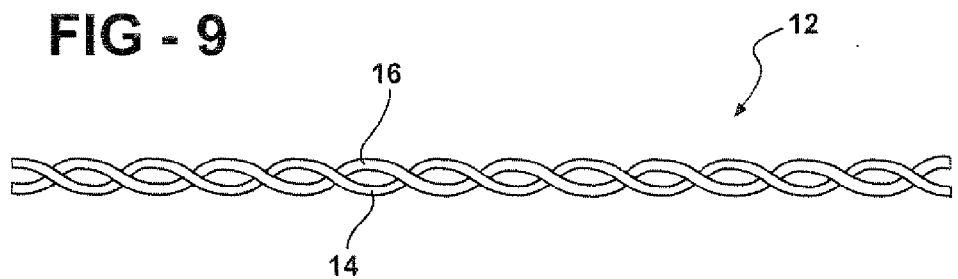
FIG. 9 is an enlarged schematic view of a yarn constructed according to yet another presently preferred embodiment.

As shown in FIG. 9, in accordance with yet another presently preferred aspect of the invention, a hybrid yarn member 12 is constructed by serving, or as shown, twisting a single conductive wire filament 16 about a single nonconductive filament 14, shown here as being a monofilament formed from one of the aforementioned materials.

Figure 10:
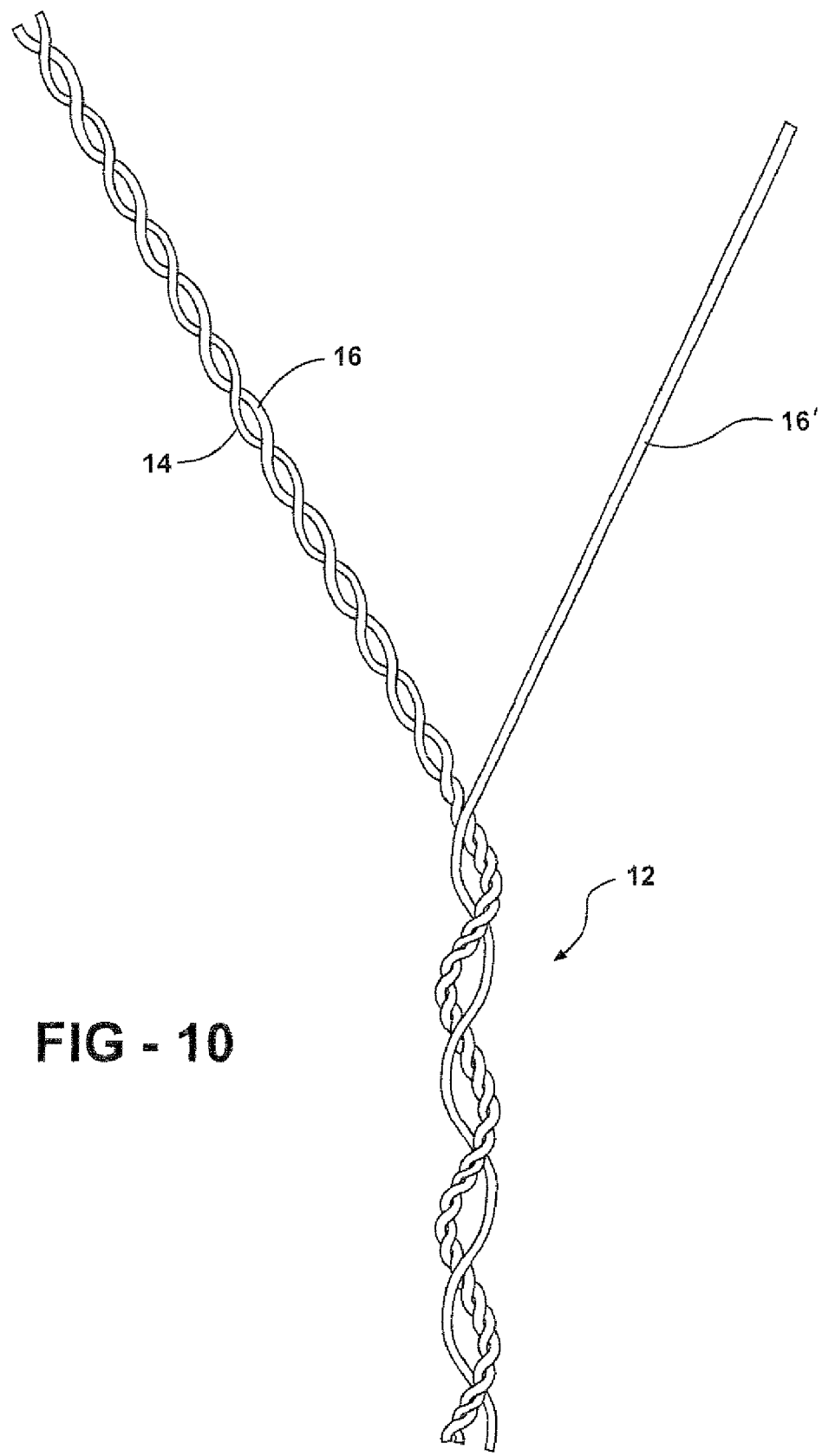
FIG. 10 is an enlarged schematic view of a yarn constructed according to yet another presently preferred embodiment.

As shown in FIG. 10, in accordance with yet another presently preferred aspect of the invention, a hybrid yarn member 12 is constructed by first serving, or twisting a first conductive wire filament 16 about a single nonconductive filament, shown here as a monofilament 14 in one direction (S or Z direction), as discussed above with regard to FIG. 9, and then, twisting or serving a second conductive wire filament 16' about first wire filament 16 and the nonconductive filament 14 in an opposite direction to the first wire filament 16. By twisting or serving the wire filaments 16, 16' in balanced, opposite directions to one another, the hybrid yarn member 12 is substantially balanced, and thus, does not have any significant torque generated thereabout.

Figure 11:
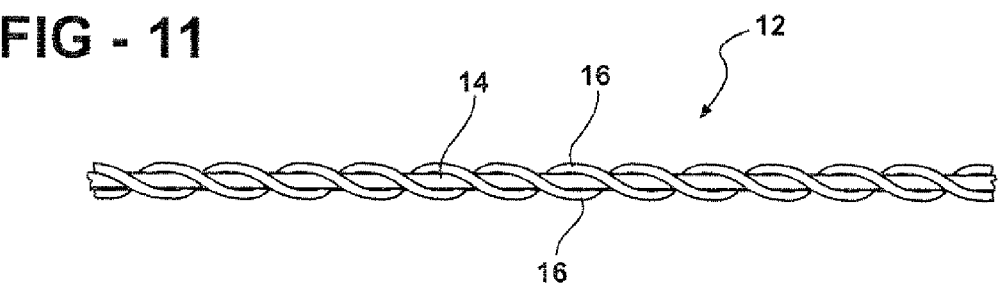
FIG. 11 is an enlarged schematic view of a yarn constructed according to yet another presently preferred embodiment.

As shown in FIG. 11, in accordance with yet another presently preferred aspect of the invention, a hybrid yarn member 12 is constructed by serving two or more conductive wire filaments 16 about a single nonconductive filament, shown here as a nonconductive monofilament 14. As shown, the wire filaments 16 in this embodiment are served in the same direction with one another having substantially the same helix angle, and thus, do not overlap one another.

Figure 12:
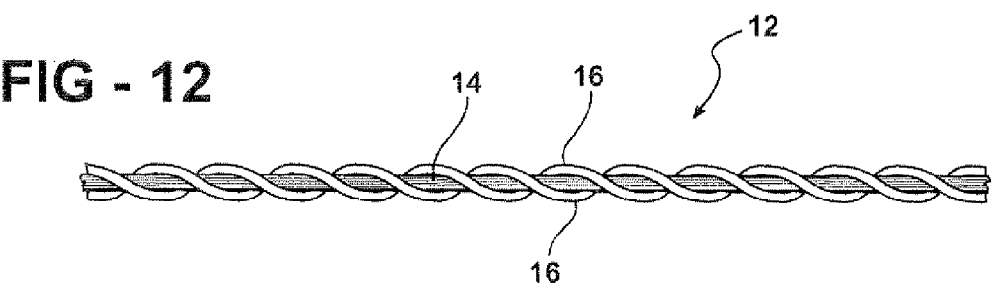
FIG. 12 is an enlarged schematic view of a yarn constructed according to yet another presently preferred embodiment.

As shown in FIG. 12, in accordance with yet another presently preferred aspect of the invention, a hybrid yarn member 12 is constructed by serving two or more conductive wire filaments 16 about a single nonconductive filament 14. However, rather than serving them about a monofilament, as in FIG. 11, the wire filaments 16 are served about a multifilament 14.

Figure 13:
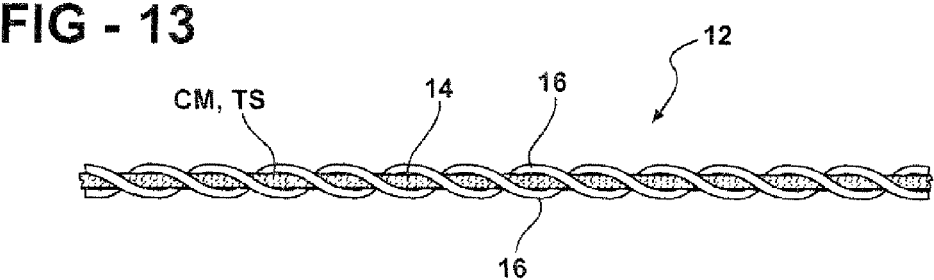
FIG. 13 is an enlarged schematic view of a yarn constructed according to yet another presently preferred embodiment.

As shown in FIG. 13, in accordance with yet another presently preferred aspect of the invention, a hybrid yarn member 12 is constructed generally the same as described above and shown in FIGS. 11 and 12 by serving two or more conductive wire filaments 16 extending in abutment with an outer surface of a single nonconductive filament, shown here as a nonconductive monofilament 14. However, prior to serving the conductive wire filaments 16 about the nonconductive filament 14, the nonconductive monofilament 14 is either treated by first applying and adhering a coating material CM to its outer surface, or the outer surface has a texturized surface TS provided thereon in a texturizing process. The coating material CM or texturized surface TS acts to inhibit the conductive wire filaments 16 from slipping relative to the underlying nonconductive monofilament 14.

Figure 14:
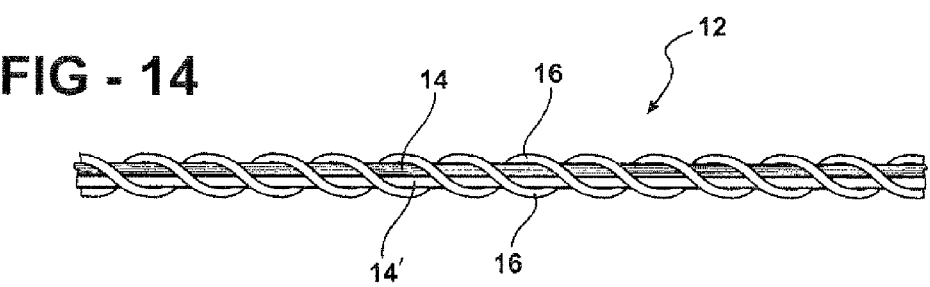
FIG. 14 is an enlarged schematic view of a yarn constructed according to yet another presently preferred embodiment.
Figure 14A:
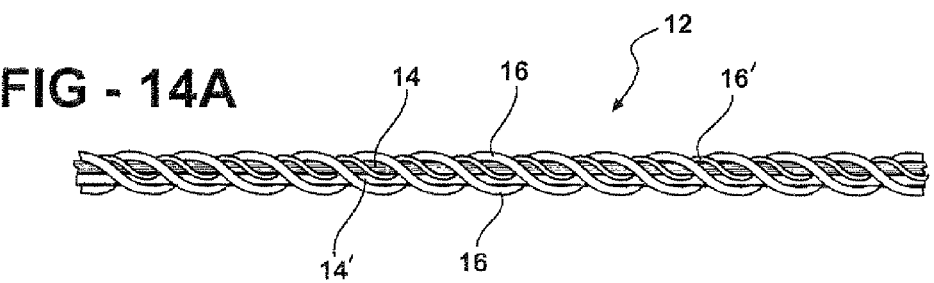
FIG. 14A is an enlarged schematic view of a yarn constructed according to yet another presently preferred embodiment.

As shown in FIG. 14, in accordance with yet another presently preferred aspect of the invention, a hybrid yarn member 12 is constructed by serving two or more conductive wire filaments 16 about a pair of nonconductive filaments 14, 14'. The nonconductive filaments 14, 14' are represented here as being a nonconductive multifilament 14 and a nonconductive monofilament 14', provided from the aforementioned materials. The nonconductive multifilament 14 and monofilament 14' substantially abut one another along their lengths. Further, as shown in FIG. 14A, a hybrid yarn member 12 constructed in accordance with yet another presently preferred aspect of the invention has at least one of the nonconductive members, shown here as the multifilament nonconductive member 14, provided as a hybrid yarn member, such as shown as discussed above with regard to FIG. 5, having another conductive wire filament 16' twisted or served thereabout, though any of the other previously described and illustrated embodiments of the hybrid yarn members 12 could be used. Accordingly, at least one of the continuous conductive wire filaments 16' extends solely about the nonconductive multifilament 14.

Figure 15:
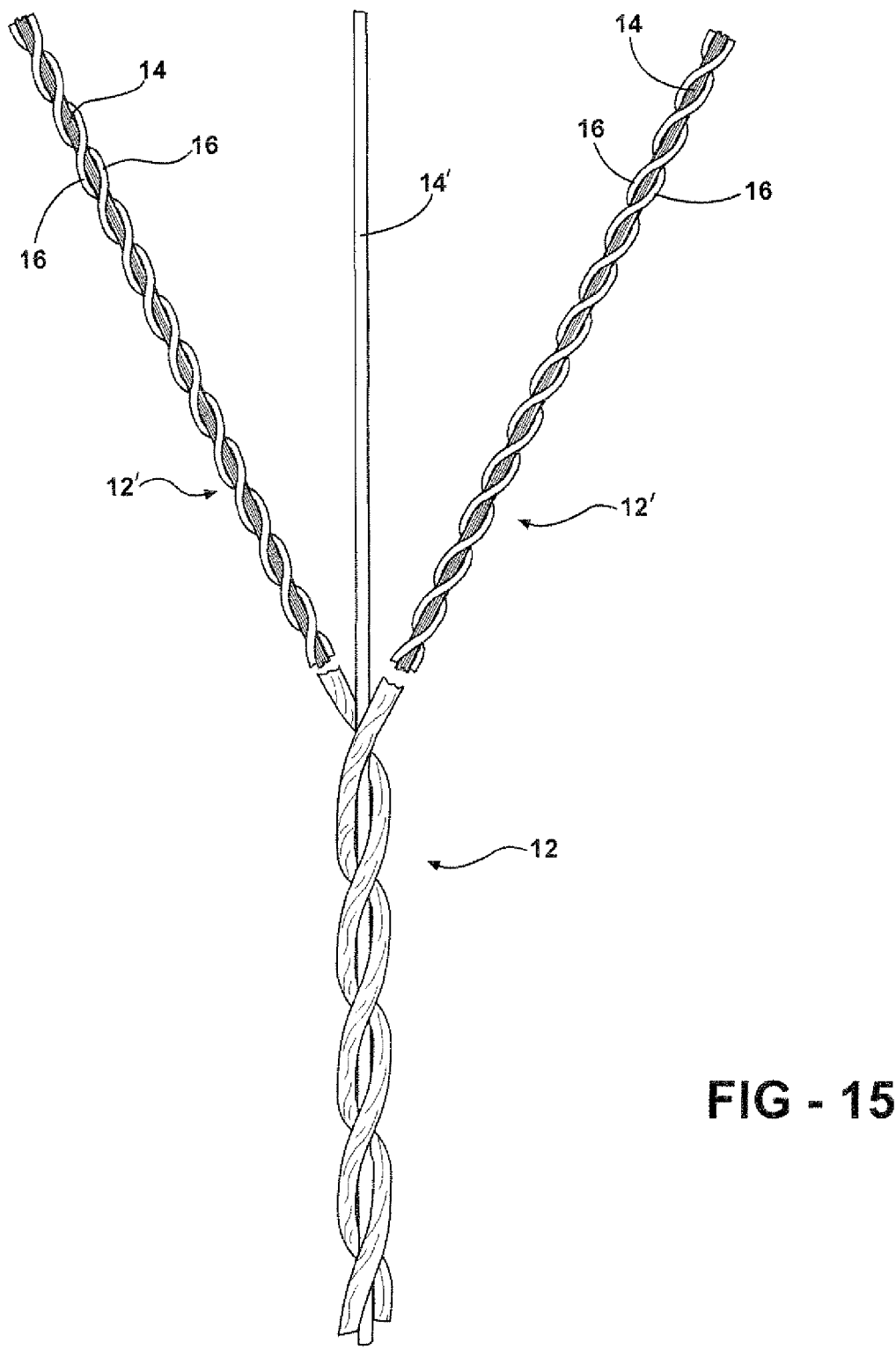
FIG. 15 is an enlarged schematic view of a yarn constructed according to yet another presently preferred embodiment.

As shown in FIG. 15, in accordance with yet another presently preferred aspect of the invention, a hybrid yarn member 12 is constructed by serving a pair of previously twisted or served hybrid yarn members 12', similarly as discussed above with regard to FIG. 7, about a nonconductive monofilament 14'. However, in the embodiment illustrated, the hybrid yarn members 12' have conductive wire filaments 16 twisted, or as illustrated, served about each nonconductive multifilament 14 in a similar helix angle. Though, the conductive wire filaments 16 of one hybrid yarn member 12' contact the conductive wire filaments 16 of the other hybrid yarn member 12' upon being served about the centrally extending nonconductive monofilament yarn member 14'.

Figure 16:
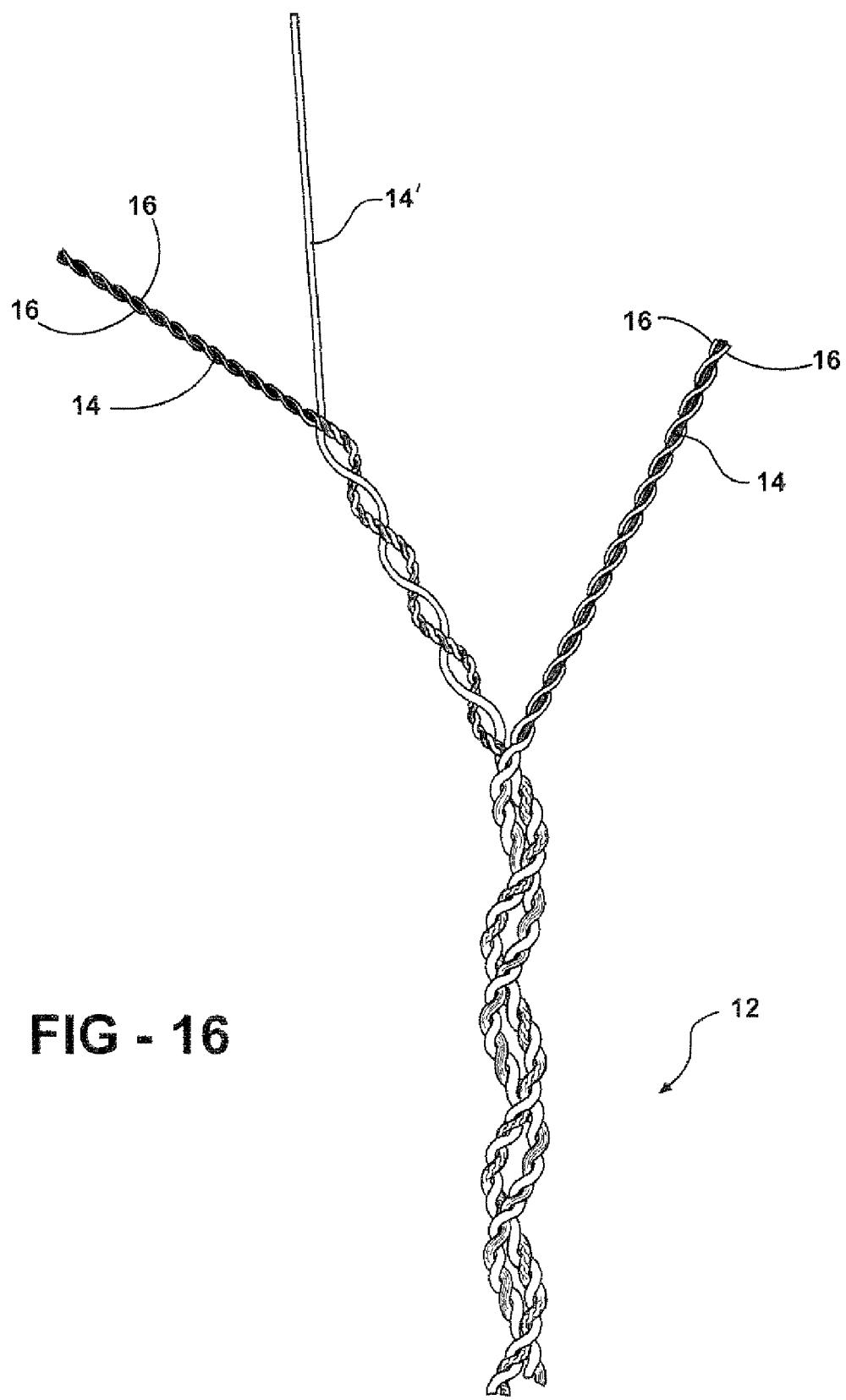
FIG. 16 is an enlarged schematic view of a yarn constructed according to yet another presently preferred embodiment.

As shown in FIG. 16, in accordance with yet another presently preferred aspect of the invention, a hybrid yarn member 12 is constructed by first twisting or serving a pair of conductive filaments 16 about a pair of separate nonconductive filaments, shown as being nonconductive multifilaments 14. Then, at least one of the twisted or served members has a nonconductive filament, shown as being a nonconductive monofilament 14', served or twisted, such as in an "S" direction, therewith. Then, the pair of separate members are twisted together, such as in a "Z" direction, to form the unitary hybrid yarn member 12.

Another aspect of the invention includes a method of constructing the fabric sleeves 10 described above for protecting elongate members against at least one of EMI, RFI and/or ESD. The method includes providing at least one or more of the aforementioned hybrid yarn members 12 each having a nonconductive elongate filament 14 and at least one elongate continuous conductive wire filament 16 overlying an outer surface of the nonconductive filament 14. Next, interlacing the hybrid yarn members 12 with one another, such as in warp and fill directions, for example to form a fabric, wherein the wire filaments 16 extending along the warp direction are brought into direct conductive electrical communication with the wire filaments 16 extending along the fill direction. In accordance with various methods of constructing sleeves 10, the fabric sleeve can be constructed via a weaving, knitting, crocheting, or braiding process. As such, it should be recognized that the method includes additional steps, as necessary, for example, where the sleeve 10 is a braided sleeve, using a braiding process with one or more of the aforementioned hybrid yarn members 12, to arrive at the specific sleeve constructions described above, as desired. It should be further understood that if the resulting sleeve is braided, crocheted, or knitted using other than warp or weft knitting forms of knitting, that the use of warp and weft directions above may not apply to the sleeves constructed from these methods of construction. Regardless, it is to be understood that the hybrid yarn members 12 can be interlaced using virtually any textile construction method to form a protective sleeve In addition, the sleeves 10 constructed from the hybrid yarn members 12 can be constructed to conform to a multitude of widths, heights and lengths and configurations for use in a variety of applications.

Obviously, many modifications and variations of the present invention are possible in light of the above teachings. It is, therefore, to be understood that within the scope of the appended claims, the invention may be practiced otherwise than as specifically described.

What is claimed is:

1. A fabric sleeve for protecting elongate members against at least one of EMI, RFI or EDS, comprising:
    at least one hybrid yarn filament having an elongate nonconductive monofilament and a first elongate continuous conductive wire filament overlying an outer surface of said nonconductive monofilament;
    wherein said first wire filament is interlaced in electrical communication with itself or with other wire filaments along a portion of said sleeve to provide protection to the elongate members against at least one of EMI, RFI or EDS;
    said hybrid yarn filament further including at least one nonconductive multifilament, said first continuous conductive wire filament also overlying an outer surface of said at least one nonconductive multifilament; and
    said hybrid yarn filament further including a second elongate continuous conductive wire filaments, wherein said second elongate continuous conductive wire filament extends solely about said nonconductive multifilament.

2. The fabric sleeve of claim 1 wherein said first and second continuous conductive wire filaments extend in opposite helix directions to one another.

3. The fabric sleeve of claim 1 wherein said first and second continuous conductive wire filaments extend in the same helix directions to one another.

4. The fabric sleeve of claim 1 wherein said nonconductive monofilament has a texturized outer surface.

5. The fabric sleeve of claim 1 further including a coating material adhered on said outer surface of said nonconductive monofilament.

6. The fabric sleeve of claim 1 wherein said nonconductive monofilament and said nonconductive multifilament substantially abut one another along their lengths.

7. The fabric sleeve of claim 1 wherein said hybrid yarn is woven.

8. The fabric sleeve of claim 1 wherein said hybrid yarn is knit.

9. The fabric sleeve of claim 1 wherein said hybrid yarn is braided.

10. The fabric sleeve of claim 1 wherein said hybrid yarn is crocheted.

11. A fabric sleeve for protecting elongate members against at least one of EMI, RFI or EDS, comprising:
    at least one hybrid yarn filament having an elongate nonconductive monofilament and at least one elongate continuous conductive wire filament overlying an outer surface of said nonconductive monofilament;
    wherein said at least one wire filament is interlaced in electrical communication with itself or with other wire filaments along a portion of said sleeve to provide protection to the elongate embers against at least one of EMI, RFI or EDS;
    said at least one hybrid yarn filament further including a pair of nonconductive multifilaments and said at least one continuous conductive wire filament including two pairs of continuous conductive wire filaments,
    wherein each pair of said continuous conductive wire filaments is served or twisted about each one of said nonconductive multifilaments, and
    wherein said pair of nonconductive multifilaments with said continuous conductive wire filaments thereon are served or twisted about said nonconductive monofilament.

\* \* \* \* \*

UNITED STATES PATENT AND TRADEMARK OFFICE
CERTIFICATE OF CORRECTION

PATENT NO. : 8,283,563 B2  Page 1 of 1
APPLICATION NO. : 12/554454
DATED : October 9, 2012
INVENTOR(S) : Harris et al.

It is certified that error appears in the above-identified patent and that said Letters Patent is hereby corrected as shown below:

In the Specifications:

| Column | Line | |
|---|---|---|
| 1 | 2 | "YARD" should read "YARN" |
| 5 | 25 | "LCT" should read "LCP" |

In the Claims:

| Column | Line | |
|---|---|---|
| 9 | 54 | "EDS" should read "ESD" |
| 10 | 5 | "EDS" should read "ESD" |
| 10 | 37 | "EDS" should read "ESD" |
| 10 | 45 | "EDS" should read "ESD" |
| 10 | 44 | "embers" should read "members" |
| 10 | 11 | "filaments" should be "filament" |

Signed and Sealed this
Sixteenth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,283,563 B2  
APPLICATION NO. : 12/554454  
DATED : October 9, 2012  
INVENTOR(S) : Harris et al.

Page 1 of 1

It is certified that error appears in the above-identified patent and that said Letters Patent is hereby corrected as shown below:

Title Page, Item (54) and in the specification, column 1, line 2, Title, "YARD" should read --YARN--

In the Specifications:

| Column | Line | |
|---|---|---|
| 5 | 25 | "LCT" should read --LCP-- |

In the Claims:

| | | |
|---|---|---|
| 9 | 54 | "EDS" should read --ESD-- |
| 10 | 5 | "EDS" should read --ESD-- |
| 10 | 11 | "filaments" should be --filament-- |
| 10 | 37 | "EDS" should read --ESD-- |
| 10 | 44 | "embers" should read --members-- |
| 10 | 45 | "EDS" should read --ESD-- |

This certificate supersedes the Certificate of Correction issued April 16, 2013.

Signed and Sealed this  
Twenty-first Day of May, 2013

Teresa Stanek Rea  
*Acting Director of the United States Patent and Trademark Office*